United States Patent
Girod et al.

(10) Patent No.: US 10,403,274 B2
(45) Date of Patent: Sep. 3, 2019

(54) AUTOMATIC SPEECH RECOGNITION WITH DETECTION OF AT LEAST ONE CONTEXTUAL ELEMENT, AND APPLICATION MANAGEMENT AND MAINTENANCE OF AIRCRAFT

(71) Applicant: DASSAULT AVIATION, Paris (FR)

(72) Inventors: Hervé Girod, Paris (FR); Paul Kou, Paris (FR); Jean-François Saez, Louveciennes (FR)

(73) Assignee: DASSAULT AVIATION, Paris (FR)

( * ) Notice: Subject to any disclaimer, the term of this patent is extended or adjusted under 35 U.S.C. 154(b) by 0 days.

(21) Appl. No.: 15/264,722

(22) Filed: Sep. 14, 2016

(65) Prior Publication Data

US 2017/0076722 A1   Mar. 16, 2017

(30) Foreign Application Priority Data

Sep. 15, 2015  (FR) .................................... 15 01907

(51) Int. Cl.
*G10L 15/22* (2006.01)
*B64C 39/02* (2006.01)
(Continued)

(52) U.S. Cl.
CPC ............ *G10L 15/22* (2013.01); *B64C 39/024* (2013.01); *B64D 43/00* (2013.01); *G06F 3/012* (2013.01);
(Continued)

(58) Field of Classification Search
CPC ....... G10L 15/187; G10L 15/19; G10L 15/30; G06F 3/013; G06F 3/167; G06F 3/038
See application file for complete search history.

(56) References Cited

U.S. PATENT DOCUMENTS 6,128,594 A   10/2000  Gulli et al.
8,924,212 B1  12/2014  Allauzen et al.
(Continued)

FOREIGN PATENT DOCUMENTS

FR     2744277     8/1997

OTHER PUBLICATIONS

Hatfield et al., Eye/Voice Mission Planning Interface (EVMPI), Dec. 1995, pp. 1-113.
(Continued)

*Primary Examiner* — Pierre Louis Desir
*Assistant Examiner* — Yi Sheng Wang
(74) *Attorney, Agent, or Firm* — Davidson, Davidson & Kappel, LLC

(57) ABSTRACT

An automatic speech recognition with detection of at least one contextual element, and application to aircraft flying and maintenance are provided. The automatic speech recognition device comprises a unit for acquiring an audio signal, a device for detecting the state of at least one contextual element, and a language decoder for determining an oral instruction corresponding to the audio signal. The language decoder comprises at least one acoustic model defining an acoustic probability law and at least two syntax models each defining a syntax probability law. The language decoder also comprises an oral instruction construction algorithm implementing the acoustic model and a plurality of active syntax models taken from among the syntax models, a contextualization processor to select, based on the state of the order each contextual element detected by the detection device, at least one syntax model selected from among the plurality of active syntax models, and a processor for determining the oral instruction corresponding to the audio signal.

15 Claims, 7 Drawing Sheets

(51) Int. Cl.
*G06F 3/01* (2006.01)
*B64D 43/00* (2006.01)
*G10L 15/18* (2013.01)
*G10L 15/02* (2006.01)
*G10L 15/187* (2013.01)

(52) U.S. Cl.
CPC .............. *G06F 3/013* (2013.01); *G10L 15/02* (2013.01); *G10L 15/187* (2013.01); *G10L 15/1815* (2013.01); *B64C 2201/146* (2013.01); *G10L 2015/025* (2013.01); *G10L 2015/223* (2013.01); *G10L 2015/227* (2013.01); *G10L 2015/228* (2013.01)

(56) References Cited

U.S. PATENT DOCUMENTS

| | | | |
|---|---|---|---|
| 2002/0077830 A1 | 6/2002 | Suomela et al. | |
| 2004/0193408 A1* | 9/2004 | Hunt | G10L 15/08 704/209 |
| 2005/0010412 A1* | 1/2005 | Aronowitz | G10L 15/02 704/254 |
| 2005/0182628 A1* | 8/2005 | Choi | G10L 15/08 704/252 |
| 2006/0074660 A1* | 4/2006 | Waters | G10L 15/26 704/251 |
| 2009/0157403 A1* | 6/2009 | Chung | G10L 15/187 704/254 |
| 2010/0030400 A1* | 2/2010 | Komer | G10L 15/26 701/3 |
| 2011/0099013 A1* | 4/2011 | Melamed | G10L 15/19 704/255 |
| 2013/0307771 A1* | 11/2013 | Parker | G06F 3/013 345/158 |
| 2015/0088510 A1* | 3/2015 | Allauzen | G10L 15/187 704/243 |
| 2015/0112675 A1* | 4/2015 | Zhang | G10L 15/187 704/235 |

OTHER PUBLICATIONS

French Search Report for French Priority Application.
Research Report from European Patent Office for French Priority Application.

\* cited by examiner

AUTOMATIC SPEECH RECOGNITION WITH DETECTION OF AT LEAST ONE CONTEXTUAL ELEMENT, AND APPLICATION MANAGEMENT AND MAINTENANCE OF AIRCRAFT

This claims the benefit of French Patent Application FR 15 01907, filed Sep. 15, 2015 and hereby incorporated by reference herein.

The present invention relates to an automatic speech recognition device, of the type comprising a unit for acquiring an audio signal, a member for forming the audio signal, for dividing the audio signal into frames, and a language decoder to determine an oral instruction corresponding to the audio signal, the language decoder comprising:

- at least one acoustic model defining an acoustic probability law making it possible to calculate, for each phoneme of a sequence of phonemes, an acoustic probability of that phoneme and a corresponding frame of the audio signal matching, and
- at least one syntax model defining a syntax probability law making it possible to calculate, for each phoneme of a sequence of phonemes analyzed using said acoustic model, a syntax probability of that phoneme following the phoneme or group of phonemes preceding said phoneme in the sequence of phonemes.

The invention also relates to an automatic speech recognition method implemented by a device of the aforementioned type.

The information or control systems increasingly frequently use speech interfaces to make the interaction with the user quick and intuitive. These speech interfaces use automatic speech recognition devices to recognize the oral instructions communicated to the information or control system by the user.

One issue encountered by the designers of these automatic speech recognition devices is allowing the use of natural language while achieving a recognition rate as close as possible to 100%. Another issue is achieving a recognition rate as close as possible to 100% while allowing the recognition of a large number of instructions.

BACKGROUND

One solution for reconciling these aims consists of using very reliable acoustic models making it possible to achieve a low error rate in calculating the acoustic probabilities. This solution is typically the solution implemented in automatic speech recognition devices for modern personal assistants, in particular known under the brands Siri® and Cortana®.

One drawback of this solution is that the acoustic models used require the use of significant computing powers to process very large databases. This makes the solution difficult to use in mobile situations, without a connection to a server having the computing means and memory necessary to implement this solution, which may be the case on board an aircraft.

Another solution consists of using automatic speech recognition devices with restricted syntax, i.e., for which the recognizable phrases are found in a predetermined set of possibilities. These recognition devices make it possible to achieve a very high recognition rate even with fairly unreliable acoustic models, and do not require large computing powers or large databases; they are thus very well suited for use in mobile situations.

One drawback of these devices, however, is that they only make it possible to recognize a limited number of instructions.

A third solution is disclosed in the document "Eye/voice mission planning interface (EVMPI)" (F. Hatfield, E. A. Jenkins and M. W. Jennings, December 1995). This solution consists of modifying the syntax model of the language decoder of an automatic speech recognition device based on the direction of the user's gaze. To that end, the automatic speech recognition device comprises a gaze detector to determine a point fixed by the gaze of the user on a monitor, a fusion engine suitable for modifying the syntax probability law of the syntax model based on the information communicated by an application associated with the point targeted by the user's gaze on the monitor.

This automatic speech recognition device thus makes it possible to recognize a large number of instructions, since it is able to recognize the instructions associated with each of the applications displayed on the monitor. This automatic speech recognition device makes it possible, at the same time, to obtain a good recognition rate, even with a fairly unreliable acoustic model, since the syntax model used at each moment to recognize the oral instructions pronounced by the user only has a vocabulary restricted to the vocabulary of the application looked at by the user; there is therefore a low likelihood of confusion between two words with a similar pronunciation.

Recalculating the syntax probability law in real time in this way is, however, a complex operation, difficult to carry out, slowed by the exchanges of information between the fusion engine and the applications, and which prevents the operation of the linguistic engine while the recalculation is in progress. This results in significant lag time. Furthermore, this solution may create a high error rate if the user does not look in the direction of the application affected by his instructions.

A final solution is disclosed in document FR-A-2,744, 277. This solution consists of modifying the syntax model of the language decoder of an automatic speech recognition device based on different parameters, such as the parameters of the mobile carrier, the type and phase of the mission and progress or the history of commands previously executed.

This solution has the same drawbacks as the third solution described above.

SUMMARY OF THE INVENTION

One aim of the invention is thus to allow the automatic speech recognition of oral instructions over an extended vocabulary, the speech recognition reaching a recognition rate close to 100%, with a short lag time. Another aim is that this speech recognition can be done autonomously by devices having limited computing power while being very intuitive for the user and relevant operationally speaking.

To that end, the invention provides an automatic speech recognition device of the aforementioned type, in which the speech recognition device comprises a detection device to detect the state of at least one contextual element, there are at least two syntax models, and the language decoder comprises:

- an oral instruction construction algorithm implementing the acoustic model and a plurality of active syntax models from among the syntax models to build, for each active syntax model, a candidate sequence of phonemes associated with said active syntax model so that the product of the acoustic and syntax probabilities of the different phonemes making up said candidate sequence of phonemes is maximal, a contextualization processor to select, based on the state of the order each contextual element detected by the detection device (36), at least one syntax model selected from among the plurality of active syntax models, and a processor for determining the oral instruction corresponding to the audio signal, to define the candidate sequence of phonemes associated with the selected syntax model or, if several syntax models are selected, the sequence of phonemes, from among the candidate sequences of phonemes associated with the selected acoustic models, for which the product of the acoustic and syntax probabilities of different phonemes making up said sequence of phonemes is maximal, as making up the oral instruction corresponding to the audio signal.

According to specific embodiments of the invention, the automatic speech recognition device also comprises one or more of the following features, considered alone or according to any technically possible combination(s):

the contextualization processor is suitable for:
assigning, based on the state of the detected contextual element, an order number to each active syntax model,
seeking, among the active syntax models, candidate syntax models with which candidate sequences of phonemes are associated for which the product of the acoustic and syntax probabilities of the different phonemes making up said candidate sequences of phonemes is above a predetermined threshold, and
selecting the candidate syntax model(s) having the highest order number;

at least one contextual element is independent from the audio signal;

the automatic speech recognition device comprises a gaze detector suitable for detecting the direction of a user's gaze or a pointing detector suitable for detecting the position of a pointing member such as a cursor;

the automatic speech recognition device comprises a display device displaying objects, each syntax model being associated with a respective object from among the displayed objects, the contextualization processor being suitable for assigning its order number to each syntax model based on the distance between the direction of the user's gaze or the position of the pointer and the displayed object with which said syntax model is associated;

the language decoder comprises a processor for activating syntax models to activate, based on the state of the detected contextual element, a plurality of syntax models forming the active syntax models;

the language decoder comprises a processor for deactivating syntax models to deactivate, based on the state of the detected contextual element, at least one syntax model from among the active syntax models; and the contextualization processor is suitable for automatically selecting the or each selected syntax model.

The invention also provides a system to assist with the piloting or maintenance of an aircraft, comprising an automatic speech recognition device as defined above, and a command execution unit to execute the oral instruction corresponding to the audio signal.

According to one particular embodiment of the invention, the piloting aid system also comprises the following feature:

the detection device comprises a flight phase detector of the aircraft or a system status of the aircraft.

The invention also provides an automatic speech recognition method for determining an oral instruction corresponding to an audio signal, the method being implemented by an automatic speech recognition device comprising:

at least one acoustic model defining an acoustic probability law making it possible to calculate, for each phoneme of a sequence of phonemes, an acoustic probability of that phoneme and a corresponding frame of the audio signal matching, and at least one syntax model defining a syntax probability law making it possible to calculate, for each phoneme of a sequence of phonemes analyzed using said acoustic model, a syntax probability of that phoneme following the phoneme or group of phonemes preceding said phoneme in the sequence of phonemes, there being at least two syntax models, and the method comprising the following steps:

acquiring the audio signal,
detecting the status of at least one contextual element,
activating a plurality of syntax models forming active syntax models,
forming the audio signal, said forming comprising dividing the audio signal into frames,
building, for each active syntax model, using the acoustic model and said active syntax model, a candidate sequence of phonemes associated with said active syntax model so that the product of the acoustic and syntax probabilities of the different phonemes making up said candidate sequence of phonemes is maximal,
selecting, based on the state of the detected contextual element, at least one syntax model from among the active syntax models; and
defining the candidate sequence of phonemes associated with the selected syntax model or, if several syntax models are selected, the sequence of phonemes, from among the candidate sequences of phonemes associated with the selected syntax models, for which the product of the acoustic and syntax probabilities of different phonemes making up said sequence of phonemes is maximal, as making up the oral instruction corresponding to the audio signal.

According to preferred embodiments of the invention, the automatic speech recognition method also comprises one or more of the following features, considered alone or according to any technically possible combination(s):

the selection step comprises the following sub-steps:
assigning, based on the state of the detected contextual element, an order number to each active syntax model,
seeking, among the active syntax models, candidate syntax models with which candidate sequences of phonemes are associated for which the product of the acoustic and syntax probabilities of the different phonemes making up said candidate sequences of phonemes is above a predetermined threshold, and
selecting candidate syntax model(s) having the highest order number;

at least one contextual element is independent from the audio signal;

the contextual element comprises a direction of a user's gaze or a position of a pointing member such as a cursor;

objects are displayed on a display device, each syntax model being associated with a respective object from among the displayed objects, and the order number is assigned to each syntax model based on the distance between the direction of the user's gaze or the position of the pointing member and the displayed object with which said syntax model is associated;

the direction of the user's gaze is made up of a direction of the user's gaze at the end of the acquisition of the audio signal;

the activation of the syntax models comprises the following sub-steps:
  designating, based on the state of the detected contextual element, a plurality of designated syntax models from among the syntax models, and
  activating the designated syntax models;

the method comprises a step for deactivating at least one syntax model from among the active syntax models based on the state of the contextual element; and the selection of the selected syntax model is done automatically.

The invention also provides an assistance method for piloting or maintenance of an aircraft, implemented by a piloting aid system or a maintenance aid system of said aircraft, said method comprising the following steps:

determining, using an automatic speech recognition method as defined above, an oral instruction corresponding to a recorded audio signal, and executing the oral instruction via the assistance system.

According to one particular embodiment of the invention, the piloting aid method also comprises the following feature:

the contextual element comprises a flight phase of the aircraft or a system status of the aircraft.

BRIEF SUMMARY OF THE DRAWINGS

Other features and advantages of the invention will appear upon reading the description below, provided solely as an example and done in reference to the appended drawings, in which.

DETAILED DESCRIPTION

In FIGS. 3 to 12, the display monitors are illustrative of real aircraft piloting aid systems, and are therefore in English, in accordance with the standard display in the aeronautics field. A translation into French of the relevant indications is provided in the description that follows.

Figure 1:
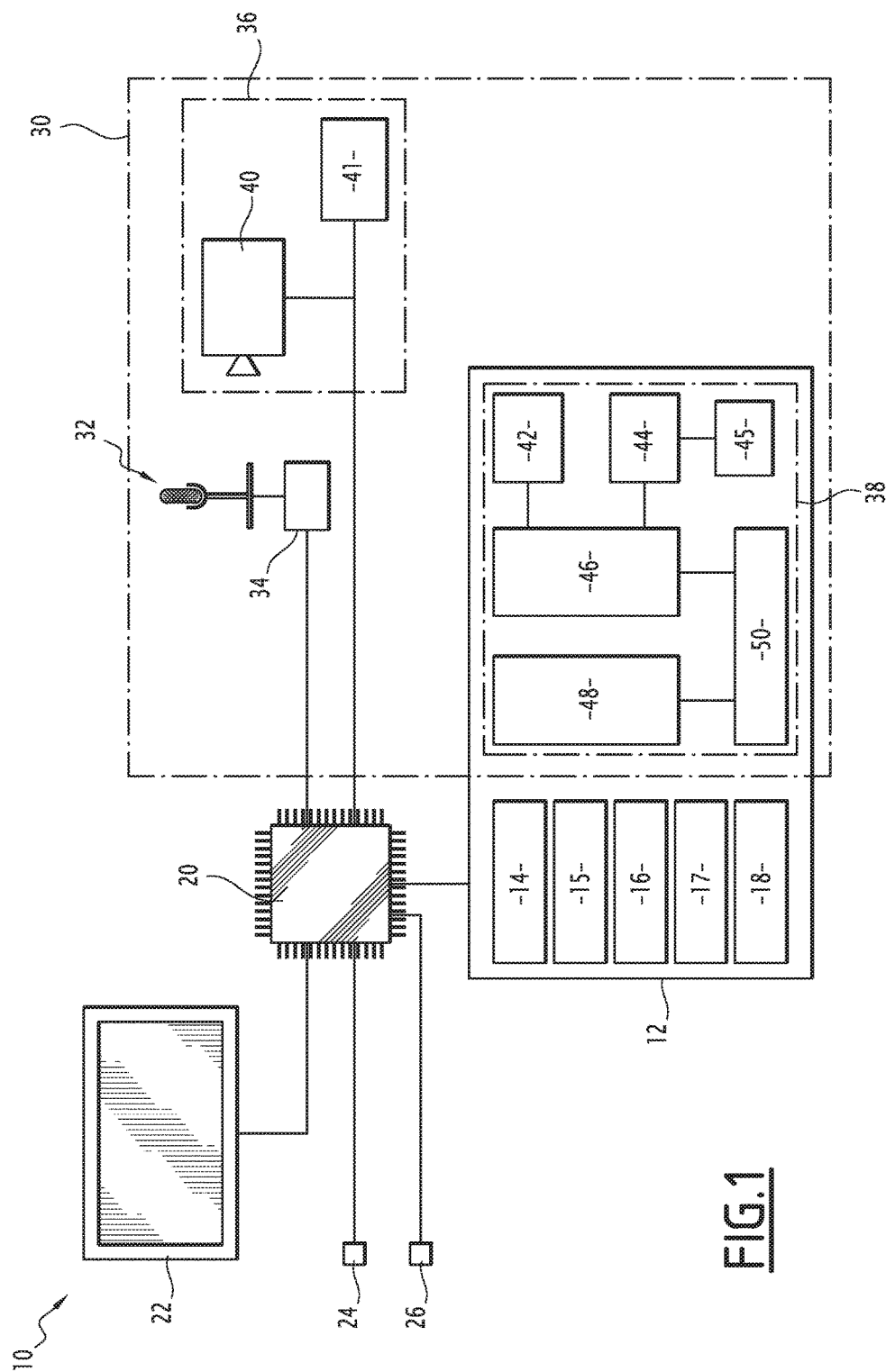
FIG. 1 is a diagrammatic view of a piloting aid system of an aircraft according to an embodiment of the invention.

The assistance system 10, shown in FIG. 1, is a piloting aid system for an aircraft. It is typically integrated into the cockpit of an aircraft, or a ground station for remote piloting of a drone. Alternatively (not shown), the assistance system 10 is a maintenance aid system for an aircraft.

This assistance system 10 comprises, in a known manner, a memory 12 storing a plurality of applications 14, 15, 16, 17, 18, a processor 20 associated with the memory 12 to run the applications 14, 15, 16, 17, 18, and a display device 22 for displaying information relative to the applications 14, 15, 16, 17, 18. The assistance system 10 also comprises inputs 24 and outputs 26 for exchanging data from the assistance system 10 with other piece of equipment of the aircraft such as the engines, flaps, air brakes, probes, radars, geolocation system, etc.

The applications 14, 15, 16, 17, 18 typically comprise:

a synoptic application 14, suitable for recovering information relative to the system state of the aircraft and presenting that information to the user in a synoptic form displayed on the display device 22 in a first window 14A (FIG. 3) when the application 14 is executed by the processor 20, a speed application 15, suitable for commanding the speeds of the aircraft and displaying said speeds on the display device 22 in a second window 15A (FIG. 3) when the application 15 is executed by the processor 20, a clock application 16, suitable for managing the clock of the assistance system 10 and alarms scheduled by the user when it is executed by the processor 20, as well as displaying said clock and said alarms on the display device 22 in a third window 16A (FIG. 6), a navigation application 17, suitable for recovering information relative to the path followed by the aircraft and displaying said information on the display device 22 in a fourth window 17A (FIG. 10) when the application 17 is executed by the processor 20, and a display management application 18, suitable for managing the display of information on the display device 22 when it is executed by the processor 20.

Optionally, the memory 12 also stores other applications (not shown) suitable for being executed by the processor 20, but without displaying information on the display device 22 when they are executed by the processor 20.

Aside from executing the applications 14, 15, 16, 17, 18 mentioned above, the processor 20 is also suitable for executing commands intended for the assistance system 10 and thus forms a command execution unit.

The display device 22 is typically a monitor.

According to an embodiment of the invention, the assistance system 10 also comprises an automatic speech recognition device 30 for recognizing oral instructions intended for the assistance system 10.

This automatic speech recognition device 30 comprises a unit 32 for acquiring an audio signal, a member 34 for forming the audio signal, a device 36 for detecting the state of at least one contextual element, and a language decoder 38.

The acquisition unit 32 is suitable for generating an audio signal representative of a sound captured by the acquisition unit. To that end, the acquisition unit 32 is typically made up of a microphone.

The forming member 34 is suitable for digitizing the audio signal by sampling and dividing it into frames, which may or may not overlap, and which may or may not have the same length. The forming member 34 is typically formed by a programmable logic component or by a dedicated integrated circuit.

The detection device 36 is suitable for detecting the state of at least one contextual element, preferably several contextual elements. These contextual elements are elements that make it possible to determine the context in which an oral instruction is pronounced by a user, and are in particular independent from the audio signal. These contextual elements typically comprise the direction of the user's gaze, the position of a pointing member on the display device 22, the flight phase of the aircraft or the system status of the aircraft.

In the illustrated example, the detection device 36 thus comprises a gaze detector 40, suitable for detecting the direction of the user's gaze, and a flight phase detector of the aircraft 41. Alternatively or optionally, the detection device 36 comprises a pointing detector (not shown), suitable for detecting the position of a pointing member such as a cursor on the display device 22, and/or a system status detector of the aircraft (not shown).

Each contextual element is suitable for assuming different states associated with this contextual element. A different state is thus associated with:

- the direction of the user's gaze for each application window displayed on the display device 22 toward which that gaze may be oriented, and the direction of the gaze is considered to be in this state when the gaze is oriented toward said window;
- the position of the pointing member for each application window displayed on the display device 22 that the pointing device may point to, and the position of the pointing member is considered to be in said state when the pointing member points toward said window;
- the flight phase of the aircraft for each flight phase in which the aircraft may be found, and the flight phase of the aircraft is considered to be in said state when the aircraft is found in said flight phase; and
- the system state of the aircraft for each combination of the state in which the systems of the aircraft can be found, and the system state of the aircraft is considered to be in said state when the states of the systems of the aircraft form said combination.

The language decoder 38 comprises an acoustic model 42, a plurality of syntax models 44, a member 45 for activating/deactivating the syntax models 44, an oral instruction construction algorithm 46, a contextualization processor 48 and a processor 50 for determining an oral instruction corresponding to the audio signal generated by the acquisition device 32.

The acoustic model 42 defines an acoustic probability law making it possible to calculate, for each phoneme of a sequence of phonemes, an acoustic probability of that phoneme and a corresponding frame of the audio signal matching. To that end, the acoustic model 42 comprises a plurality of base parameter vectors, each of said base parameter vectors reflecting the acoustic imprint of a respective phoneme.

Each syntax model 44 defines a syntax probability law making it possible to calculate, for each phoneme of a sequence of phonemes analyzed using the acoustic model, a syntax probability of that phoneme following the phoneme or group of phonemes preceding said phoneme in the sequence of phonemes. To that end, each syntax model 44 comprises a table associating each phoneme with its syntax probability based on different sequences of phonemes, said syntax probability typically being calculated using a statistical method called N-gram, or a non-contextual grammar defined using a set of rules described in Backus-Naur Form (BNF).

Each syntax model 44 is associated with a respective state of a contextual element or a respective combination of states of contextual elements. Each syntax model 44 is also associated with a flight phase of the aircraft, a system status of the aircraft, and/or an application 14, 15, 16, 17, 18.

The activating/deactivating member 45 is suitable for activating certain syntax models 44, the activated syntax models forming active syntax models, and for deactivating certain active syntax models. The activating/deactivating member 45 is in particular suitable for activating the syntax models 44 associated with the flight phase in which the aircraft is found, the system status of the aircraft, and/or the applications 14, 15, 16, 17, 18 displayed on the display device 22, and for deactivating the syntax models 44 associated with flight phases and system statuses other than those in which the aircraft is found, or associated with applications that are not displayed on the display device 22.

The oral instruction construction algorithm 46 implements the acoustic model and the active syntax models to build, for each active syntax model, a candidate sequence of phonemes associated with said active syntax model so that the product of the acoustic and syntax probabilities of the different phonemes making up said candidate sequence of phonemes is maximal. To that end, the oral instruction construction algorithm 46 is suitable for:

- associating each frame with a parameter vector that translates the acoustic information contained in the frame, for example using cepstral coefficients of the MFCC type (Mel Frequency Cepstral Coefficient"),
- seeking, for each frame, using the syntax probabilities defined by the active syntax model, phoneme candidates associated with said frame,
- calculating, for each phoneme candidate, the distance from the base parameter vector associated with said phoneme candidate by the acoustic model 42 to the parameter vector associated with the frame, so as to obtain the acoustic probability of the phoneme candidate,
- establishing candidate phoneme sequences each formed by phoneme candidates associated with the frames making up the acoustic signal, the order of the phoneme candidates in each sequence respecting the order of the frames in the acoustic signal,
- calculating, for each phoneme candidate sequence, a sequence probability equal to the product of the acoustic and syntax probabilities of different phoneme candidates making up said sequence, and
- selecting the sequence of phoneme candidates with the maximum sequence probability, said sequence of phoneme candidates making up the candidate phoneme sequence.

The contextualization processor 48 is suitable for selecting automatically, i.e., without specific action by the user, based on the state of the or each contextual element detected by the detection device 40, the or each syntax model which, among the plurality of active syntax models, is associated with the state or the combination of states of the contextual element(s) detected by the detection device 40. This or these syntax model(s) form(s) one or several selected syntax models.

To that end, the contextualization processor 48 is suitable for:

- assigning, based on the state of the detected contextual element, an order number to each active syntax model,
- seeking, among the active syntax models, candidate syntax models with which candidate sequences of phonemes are associated whose sequence probability is above a predetermined threshold, and
- selecting the candidate syntax model(s) having the highest order number.

The order number typically depends, for the syntax models 44 associated with the applications 14, 15, 16, 17, on the distance between the user's gaze or the position of the pointing member and the window 14A, 15A, 16A, 17A of said application 14, 15, 16, 17, the assignment of the order numbers for these syntax models being done inversely to the ranking of the distances of the windows 14A, 15A, 16A, 17A to the direction of the gaze or the position of the pointer; in other words, the highest order number is assigned to the syntax model 44 associated with the application 14, 15, 16, 17 whose window 14A, 15A, 16A, 17A is closest to the direction of the user's gaze or the position of the pointing member, and the lowest order number is assigned to the syntax model 44 associated with the application 14, 15, 16, 17 whose window 14A, 15A, 16A, 17A is furthest from the direction of the user's gaze or the position of the pointing member.

The order number assigned to the syntax model 44 associated with the application 18 is preferably always the highest order number.

The determining processor 50 is suitable for defining the candidate sequence of phonemes associated with the selected syntax model or, if several syntax models are selected, the sequence of phonemes, from among the candidate sequences of phonemes associated with the selected acoustic models, for which the syntax probability is maximal, as making up an oral instruction corresponding to the audio signal. This oral instruction may be a word or phrase.

It will be noted that, in the example embodiment of the invention, the language decoder 38 is made in the form of a software program stored in the memory 12 of the assistance system 10 and able to be executed by the processor 20. Alternatively, the language decoder 38 is at least partially made in the form of a programmable logic component, or in the form of a dedicated integrated circuit, included in the assistance system 10.

Figure 2:
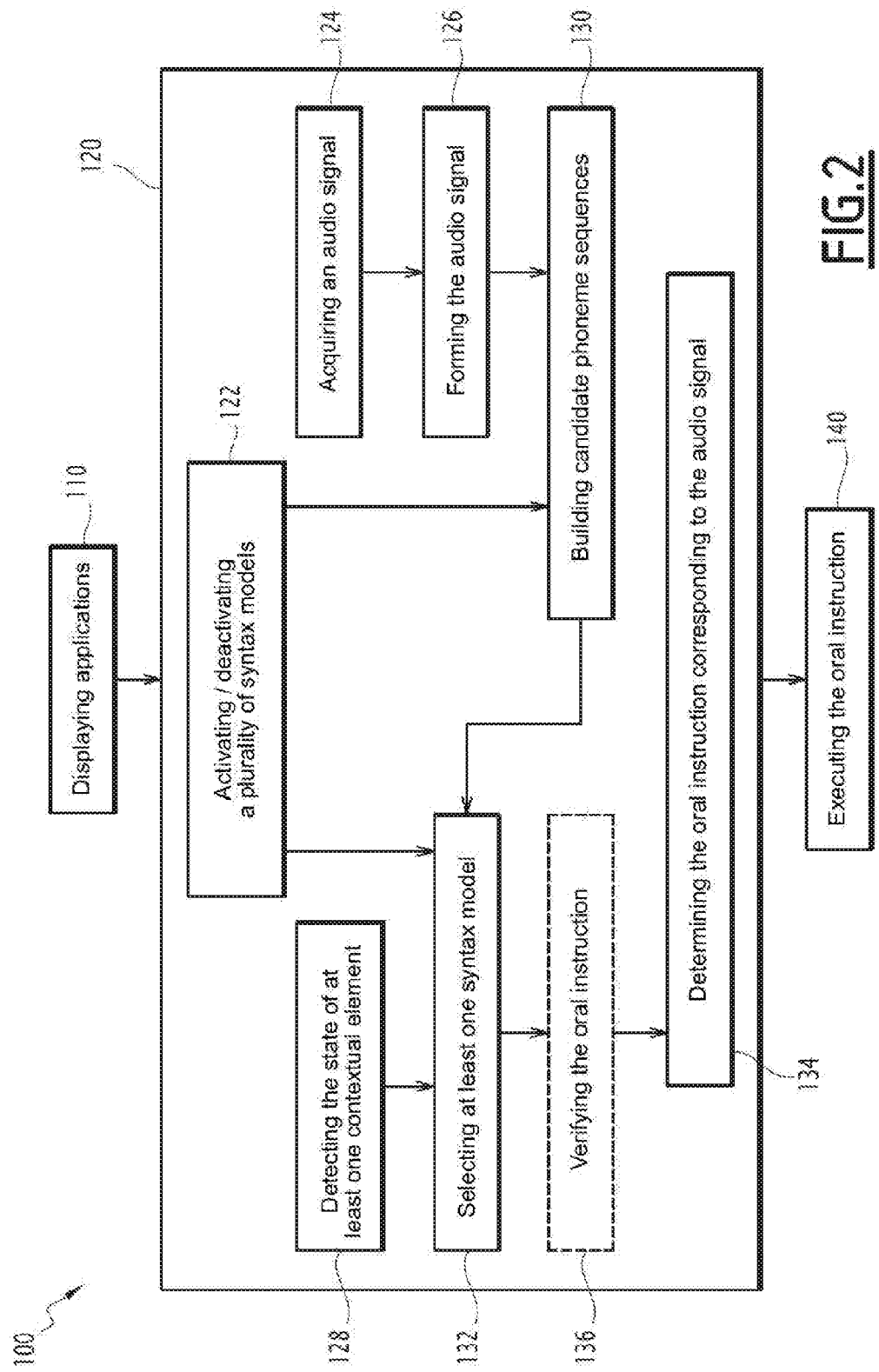
FIG. 2 is a block diagram illustrating a piloting aid method of an aircraft implemented by the piloting aid system of FIG. 1, and FIGS. 3 to 12 are examples of the display on a monitor of the piloting aid system of FIG. 1.
Figure 3:
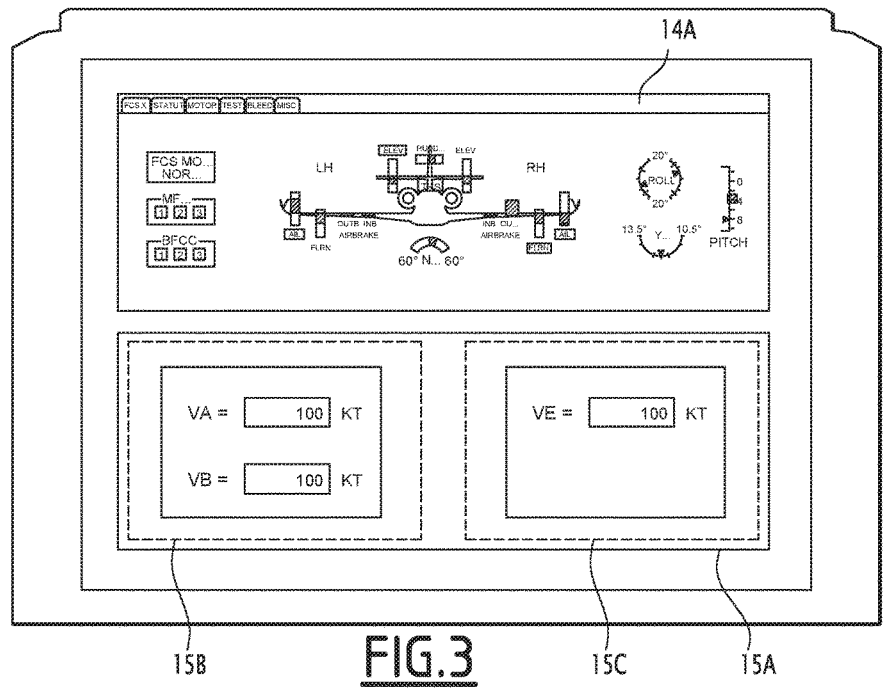

A method 100 for assisting with the piloting of an aircraft, implemented by the assistance system 10, will now be described in reference to FIGS. 2 to 4.

During a first step 110, some of the applications 14, 15, 16, 17, 18 are displayed on the display device 22. This step is illustrated in FIG. 3 by the display of the windows 14A and 15A associated with the applications 14 and 15. This step 110 typically follows the start up of the assistance system 10, or a modification of the display of the display device 22 commanded by the user.

The user next states an oral instruction intended for the assistance system 10. This oral instruction is, in the illustrated example, made up of the order: "Change the value of VA to 300 knots". At the same time as this oral instruction is transmitted, a step 120 is carried out for determining the oral instruction via the automatic speech recognition device 30 of the assistance system 10.

This determination step 120 comprises a first sub-step 122 for activating a plurality of syntax models 44 via the activating/deactivating member 45. Said step 122 is done substantially concomitantly with the display step 110.

This first sub-step 122 typically comprises the following sub-steps:
  designating a plurality of designated syntax models from among the syntax models, and
  activating the designated syntax models.

The designation of the syntax models advantageously depends on the applications 14, 15, 16, 17 displayed on the display device; the designated syntax models are then the syntax models associated with the displayed applications. Optionally, the designation also depends on the state of at least one of the contextual elements, for example when this contextual element is a flight phase of the aircraft or the system status of the aircraft; the designated syntax models are then the syntax models associated with the state of the contextual element.

Optionally, active syntax models are also deactivated during the same step 122. The deactivated syntax models preferably depend on the applications 14, 15, 16, 17 displayed on the display device and, if applicable, the state of at least one of the contextual elements, for example when this contextual element is a flight phase of the aircraft or the system status of the aircraft. The deactivated syntax models are thus typically syntax models associated with an application previously displayed on the display device 22 and the window of which has been closed, or syntax models associated with previous states of contextual elements, the contextual elements having changed state.

This first sub-step 122 thus comprises, in the illustrated example, the designation of syntax models associated with the applications 14 and 15, the syntax models associated with the application 15 comprising two syntax models respectively associated with a left region 15B and a right region 15C of the window 15A, and the activation of said designated models. The first sub-step 122 also comprises the designation of the syntax model associated with the application 18.

The determining step 120 next comprises a second sub-step 124 for acquiring an audio signal corresponding to the oral instruction emitted by the user. This acquisition is done by the acquisition unit 32, which captures a sound including the oral instruction and transcribes that sound in an electrical signal. This second sub-step 124 is followed by a third sub-step 126 for forming the audio signal, during which the audio signal is digitized and divided into frames by the forming member 34.

The determining step 120 also comprises a sub-step 128 for detection, by the detection device 36, of the state of at least one contextual element.

The contextual element whose state is detected is, in the illustrated example, the direction of the user's gaze. The direction of the user's gaze is, in a known manner, likely to change state quickly, and may thus change states several times during the statement of the oral instruction by the user; the instant at which the state of the user's gaze is detected should therefore be defined precisely. This moment is preferably the end of acquisition moment of the audio signal, corresponding to the end of the pronouncement of the oral instruction by the user.

In the illustrated example, the user's gaze is oriented, at the end of the acquisition of the audio signal, toward the lower left corner of the display device 22. The state detected by the detection device 36 is therefore "gaze oriented toward the left region 15B of the window 15A".

The determining step 120 further comprises a sub-step 130 for building sequences of candidate phonemes using the oral instruction construction algorithm 46 and a sub-step 132 for selecting a syntax model 44 by the contextualization processor 48.

The step for building sequences of candidate phonemes 130 is carried out automatically, i.e., without intervention by the user, and substantially at the same time as the step 124 for acquiring the audio signal. It comprises the following sub-steps, these sub-steps being repeated for each active syntax model:
  associating each frame with a parameter vector that translates the acoustic information contained in the frame, for example using cepstral coefficients of the MFCC type (Mel Frequency Cepstral Coefficient"),
  seeking, for each frame, using the syntax probabilities defined by the active syntax model, phoneme candidates associated with said frame,
  calculating, for each phoneme candidate, the distance from the base parameter vector associated with said phoneme candidate by the acoustic model 42 to the parameter vector associated with the frame, so as to obtain the acoustic probability of the phoneme candidate,
  establishing candidate phoneme sequences each formed by phoneme candidates associated with the frames making up the acoustic signal, the order of the phoneme candidates in each sequence respecting the order of the frames in the acoustic signal, calculating, for each phoneme candidate sequence, a sequence probability equal to the product of the acoustic and syntax probabilities of different phoneme candidates making up said sequence, and selecting the sequence of phoneme candidates with the maximum sequence probability, said sequence of phoneme candidates making up the candidate phoneme sequence.

The step for selecting a syntax model 132 is carried out automatically, i.e., without intervention by the user. It comprises the following sub-steps:

assigning, based on the state of the detected contextual element, an order number to each active syntax model, seeking, among the active syntax models, candidate syntax models with which candidate sequences of phonemes are associated whose sequence probability is above a predetermined threshold, and selecting candidate syntax model(s) having the highest order number.

The assignment of the order numbers is done using the logic described above.

Thus, in the illustrated example, the syntax model 44 associated with the application 18 and the left region 15B of the window 15A are assigned the highest order number. The syntax models associated with the application 14 and the right region 15C of the window are assigned lower order numbers.

The syntax models associated with the left 15B and right 15C regions of the window 15A return a candidate sequence of phonemes having a sequence probability higher than the predetermined threshold: the candidate sequence of phonemes of the syntax model associated with the left region 15B is "change the value of VA to 300 knots", and the candidate sequence of phonemes of the syntax model associated with the right region 15C is "change the value of VE to 300 knots". However, inasmuch as the order number of the syntax model associated with the right region 15C of the window 15A [is] lower than that of the syntax model associated with the left region 15B of the window 15A, only the latter syntax model is therefore selected.

Thus, although the speeds VA and VE are pronounced very similarly, the automatic speech recognition device 30 manages to distinguish between these two speeds owing to the orientation of the user's gaze.

The determining step 120 comprises a final sub-step 134 for determining the oral instruction corresponding to the audio signal. Inasmuch as the selected syntax model is one of the syntax models to which the highest order number had been assigned, the transition from the sub-step 132 to the sub-step 136 is done without intervention by the user.

During this sub-step 134, the sequence of phonemes associated with the selected syntax model or, if several syntax models are selected, the sequence of phonemes which, from among the candidate sequences of phonemes associated with the selected syntax models, has the maximal sequence probability, is defined as constituting the oral instruction corresponding to the audio signal.

In the illustrated example, it is therefore the candidate sequence of phonemes associated with the syntax model associated with the left region 15B of the window 15A that is thus defined as constituting the oral instruction corresponding to the audio signal.

This oral instruction is next encoded as a sequence of symbols comprehensible by the execution unit 20, then transmitted to the execution unit 20, which executes this instruction during a step 140.

Figure 4:
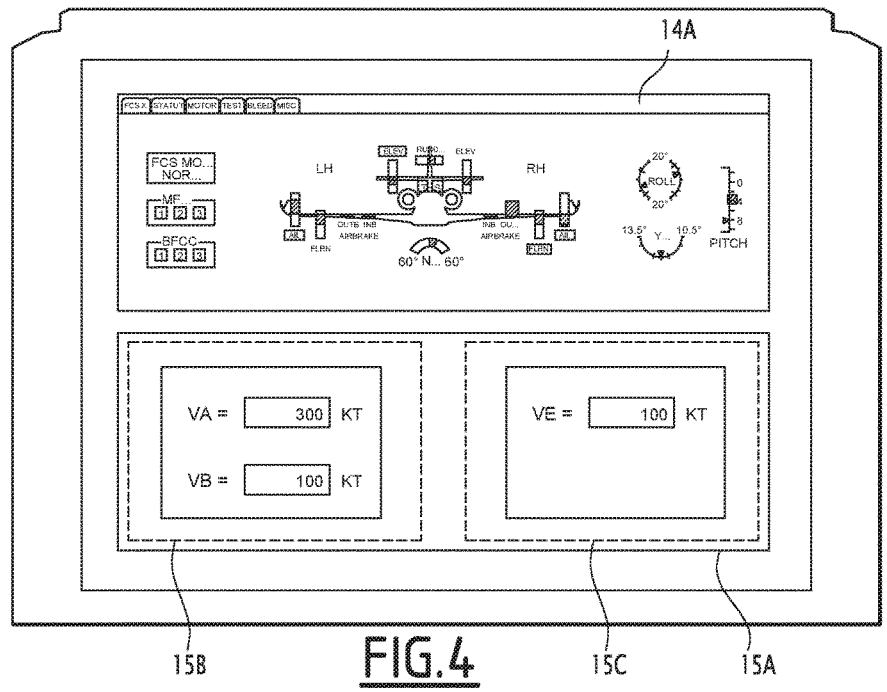

In the illustrated example, an instruction is thus sent to the left engine to increase the speed to 300 knots, and the display of the device 22 is updated to display the value 300 in the field VA (see FIG. 4).

Other example embodiments of the method 100 are provided in FIGS. 4 to 12.

The display is initially in the state shown in FIG. 4, the windows 14A and 15A being displayed. The user then pronounces the oral instruction "close the speed window", looking, at the end of the oral instruction, at the lower right corner of the display device 22.

The active syntax models are then the syntax models associated with the applications 14 and 18, as well as the syntax models associated with the left region 15B and the right region 15C of the window 15A. The state of the direction of the gaze detected by the detection device 36 is therefore the "gaze oriented toward the right region of the speed window" state. Only the syntax model associated with the application 18 returning a candidate sequence of phonemes whose sequence probability is above the predetermined threshold, it is therefore this syntax model that is selected during step 132, and it is its candidate sequence of phonemes that is defined as constituting the oral instruction corresponding to the audio signal.

Figure 5:
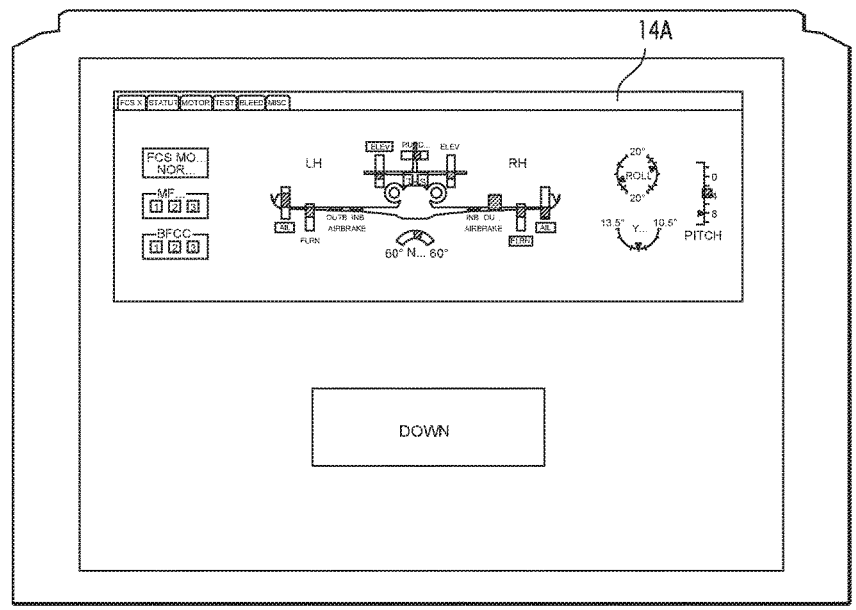

The oral instruction is next transmitted to the execution unit 140, which commands the closing of the window 15A, which then disappears from the display device, as shown in FIG. 5. At the same time, the syntax models associated with the left 15B and right 15C regions of the region 15A are deactivated.

The user next pronounces a new oral instruction "open the clock window", looking, at the end of the oral instruction, at the lower part of the display device 22.

The active syntax models are then the syntax models associated with the applications 14 and 18. The state of the direction of the gaze detected by the detection device 36 is therefore the "gaze oriented toward an empty region of the monitor" state. Only the syntax model associated with the application 18 returning a candidate sequence of phonemes whose sequence probability is above the predetermined threshold, it is therefore this syntax model that is selected during step 132, and it is its candidate sequence of phonemes that is defined as constituting the oral instruction corresponding to the audio signal.

Figure 6:
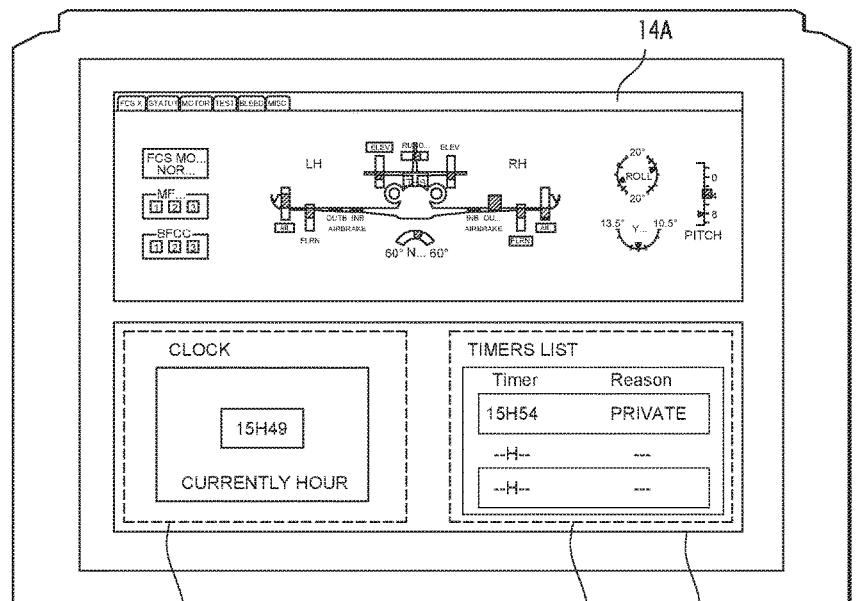

The oral instruction is next transmitted to the execution unit 140, which commands the opening of the window 16A, which then appears on the display device, as shown in FIG. 6. At the same time, the syntax models associated with the application 16 are activated, said syntax models comprising syntax models associated with the window 16A as a whole and with left 16B and right 16C regions of the window 16A, the left region 16B constituting a display region for the clock and the right region 16C constituting a display region for the scheduled alarms.

The user then pronounces a new oral instruction "schedule an alarm at 16:10", looking, at the end of the oral instruction, at the lower part of the display device 22.

The active syntax models are then the syntax models associated with the applications 14, 16 and 18. The state of the direction of the gaze detected by the detection device 36 is therefore the "gaze oriented toward the right region of the clock window" state. Only the syntax model associated with the window 16A returning a candidate sequence of phonemes whose sequence probability is above the predetermined threshold, it is therefore this syntax model that is selected during step 132, and it is its candidate sequence of phonemes that is defined as constituting the oral instruction corresponding to the audio signal.

Figure 7:
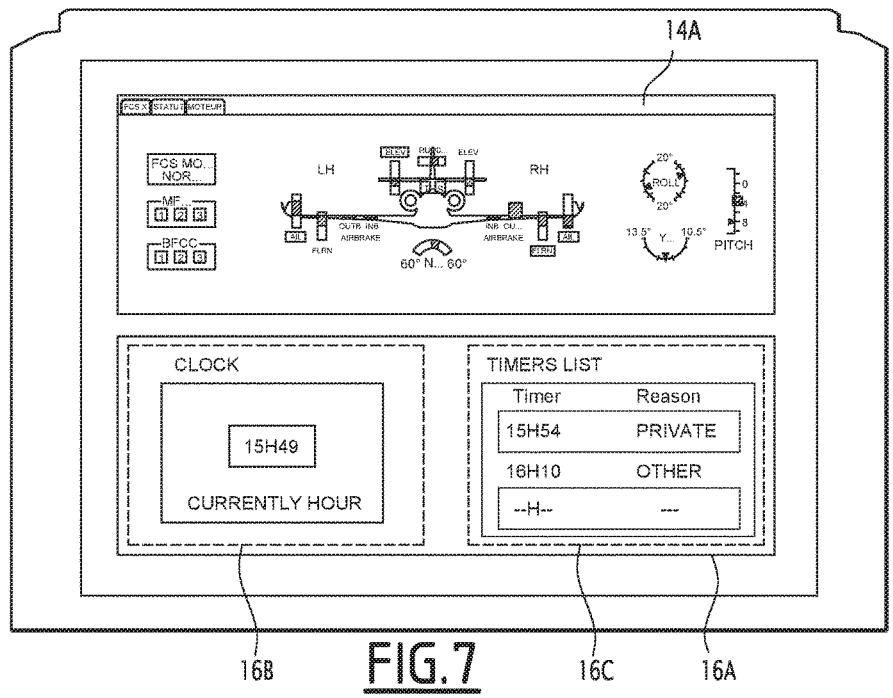

The oral instruction is next transmitted to the execution unit 140, which commands the scheduling of the alarm, and the updating of the display so that it displays, in the window 16A, of the alarm thus scheduled, as shown in FIG. 7.

The user next pronounces a new oral instruction "open the engine tab", looking, at the end of the oral instruction, at the lower left corner of the display device 22.

The active syntax models are then the syntax models associated with the applications 14, 16 and 18. The state of the direction of the gaze detected by the detection device 36 is therefore the "gaze oriented toward the left part of the clock window" state. Only the syntax model associated with the application 14 returning a candidate sequence of phonemes whose sequence probability is above the predetermined threshold, it is therefore this syntax model that is selected during step 132, even though its order number is lower than the order numbers of the syntax models associated with the application 18 and the left region 16B of the window 16A.

Inasmuch as the order number assigned to the selected syntax model is not the highest order number, the speech recognition device 30 asks the user, during a step 136, to confirm that his instruction indeed corresponds to the candidate sequence of phonemes of the selected syntax model. If this instruction is confirmed, the candidate sequence of phonemes of the selected syntax model (i.e., in the present example, the candidate sequence of phonemes of the syntax model associated with the application 14) is defined as constituting the oral instruction corresponding to the audio signal.

One thus sees that some embodiments of the invention make it possible to correct any errors in the orientation of the user's gaze.

Figure 8:
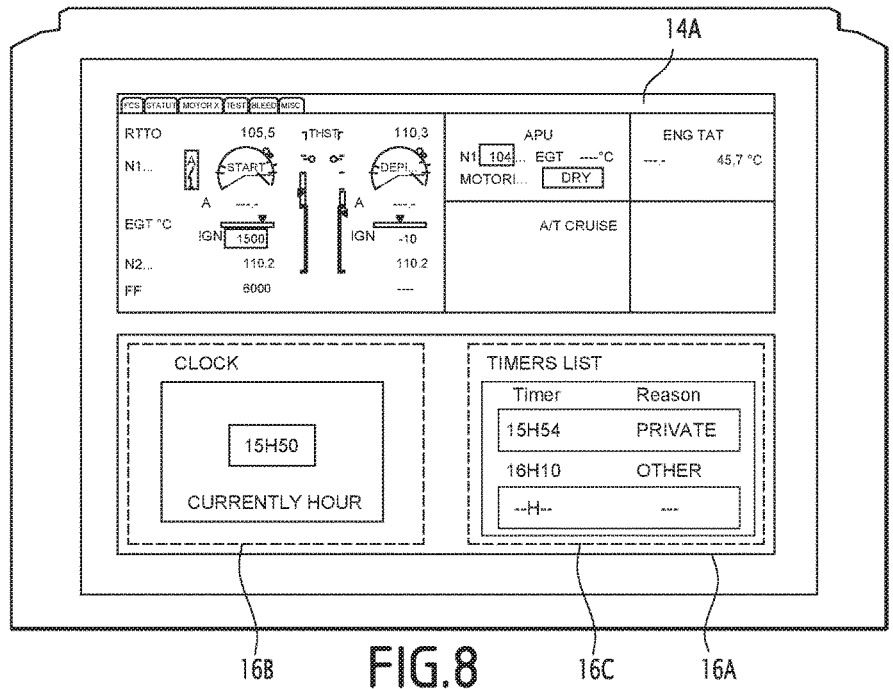

The oral instruction is next transmitted to the execution unit 140, which commands the opening of a new tab in the window 14A. The display of the window 14A is thus modified, as shown in FIG. 8.

The user then pronounces a new oral instruction "close the synoptic window", the user looking, at the end of the oral instruction, at the upper part of the display device 22.

The active syntax models are then the syntax models associated with the applications 14, 16 and 18. The state of the direction of the gaze detected by the detection device 36 is therefore the "gaze oriented toward the right region of the synoptic window" state. Only the syntax model associated with the application 18 returning a candidate sequence of phonemes whose sequence probability is above the predetermined threshold, it is therefore this syntax model that is selected during step 132, and it is its candidate sequence of phonemes that is defined as constituting the oral instruction corresponding to the audio signal.

Figure 9:
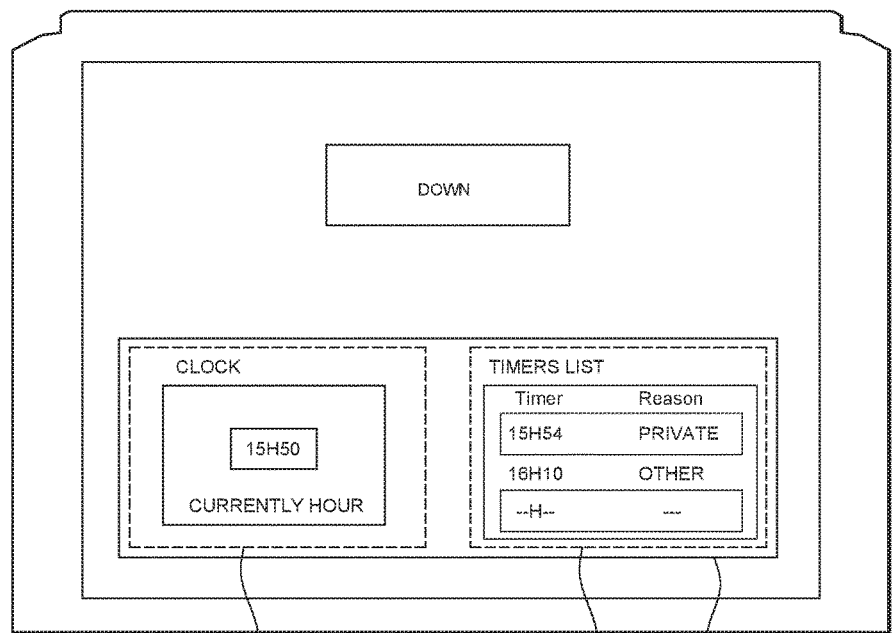

The oral instruction is next transmitted to the execution unit 140, which commands the closing of the window 14A, which then disappears from the display device, as shown in FIG. 9. At the same time, the syntax model associated with the application 14 is deactivated.

The user next pronounces a new oral instruction "open the navigation window", looking, at the end of the oral instruction, at the upper part of the display device 22.

The active syntax models are then the syntax models associated with the applications 16 and 18. The state of the direction of the gaze detected by the detection device 36 is therefore the "gaze oriented toward an empty region of the monitor" state. Only the syntax model associated with the application 18 returning a candidate sequence of phonemes whose sequence probability is above the predetermined threshold, it is therefore this syntax model that is selected during step 132, and it is its candidate sequence of phonemes that is defined as constituting the oral instruction corresponding to the audio signal.

Figure 10:
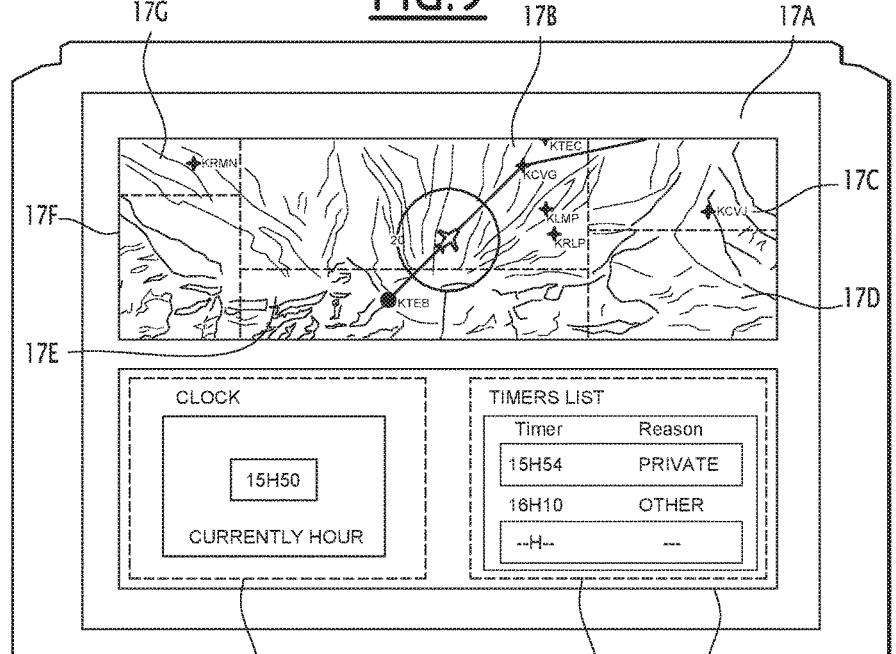

The oral instruction is next transmitted to the execution unit 140, which commands the opening of the window 17A, which then appears on the display device, as shown in FIG. 10. At the same time, the syntax models associated with the application 17 are activated, said syntax models comprising a syntax model associated with the window 17A as a whole, but also with other syntax models associated with different regions 17B, 17C, 17D, 17E, 17F, 17G of a map displayed in the window 17A.

The user next pronounces a new oral instruction "select the KCVG passage point", looking, at the end of the oral instruction, at the region 17B of the window 17A.

The active syntax models are then the syntax models associated with the applications 16, 17 and 18. The state of the direction of the gaze detected by the detection device 36 is therefore the "gaze oriented toward region B of the map" state. The syntax models associated with the application 18, the window 17A and the region 17B are therefore assigned the highest order number, while the other syntax models are assigned lower order numbers.

The syntax models associated with the regions 17B and 17C each return a candidate sequence of phonemes having a sequence probability higher than the predetermined threshold: the candidate sequence of phonemes of the syntax model associated with the region 17B is "select the KCVG passage point", and the candidate sequence of phonemes of the syntax model associated with the region 17C is "select the KCVJ passage point". Since the syntax model associated with the region 17B has a higher order number, only that syntax model is selected during step 132, and it is therefore its candidate sequence of phonemes that is defined as constituting the oral instruction corresponding to the audio signal.

Thus, although the passage points KCVG and KCVJ are pronounced very similarly, the automatic speech recognition device 30 manages to distinguish between these two passage points owing to the orientation of the user's gaze.

Figure 11:
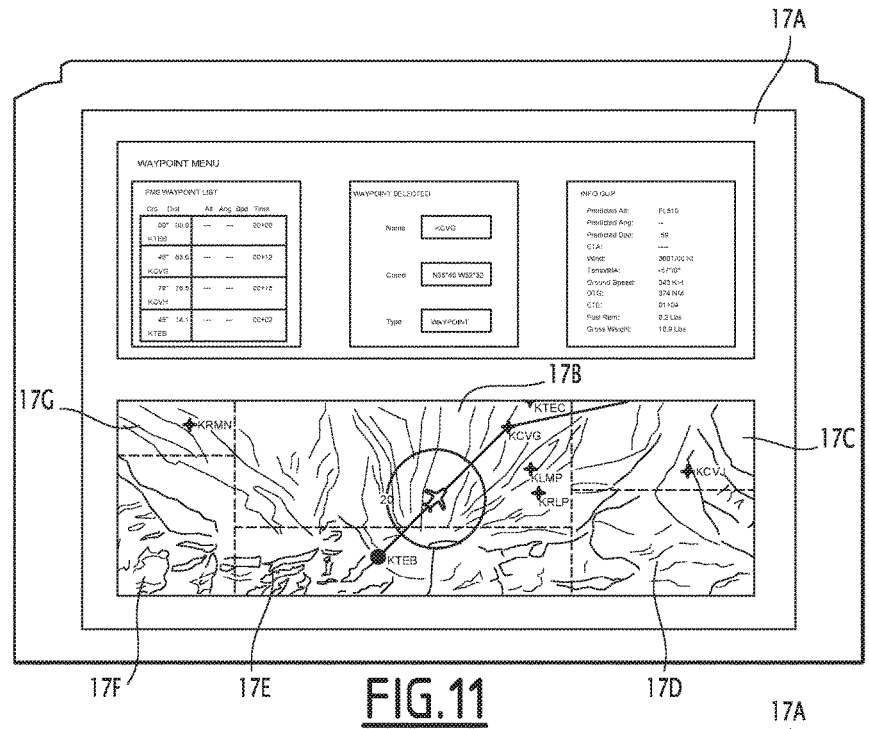
Figure 12:
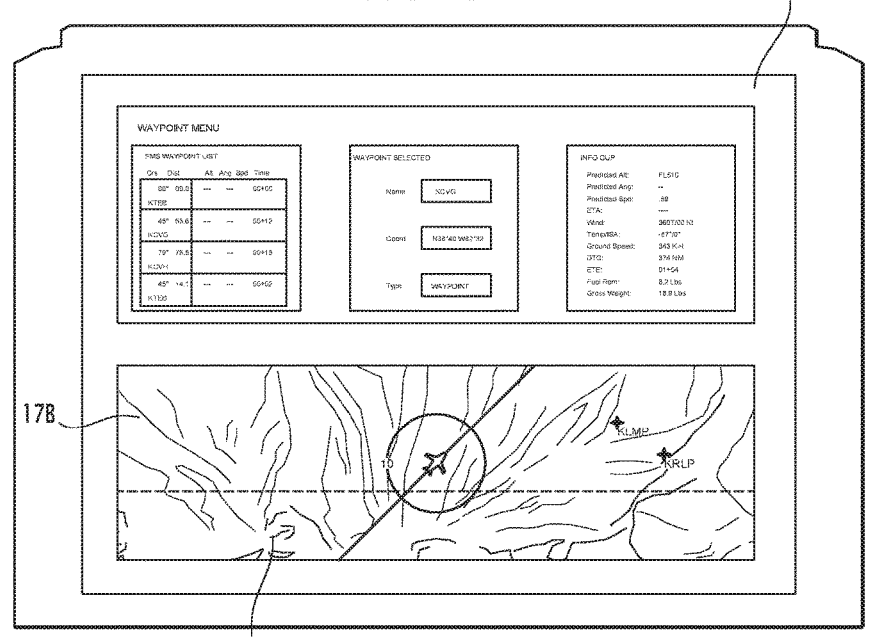

The oral instruction is next transmitted to the execution unit 140, which commands the display of information relative to the KCVG passage point on the display device 22. The window 17A then goes to full screen, as shown in FIG. 11, while the window 16A disappears. At the same time, the syntax models associated with the application 16 are deactivated.

The user lastly pronounces a final oral instruction "zoom in on the map", looking, at the end of the oral instruction, at the region 17B of the window 17A.

The active syntax models are then the syntax models associated with the applications 17 and 18. The state of the direction of the gaze detected by the detection device 36 is therefore the "gaze oriented toward region B of the map" state. The syntax models associated with the application 18, the window 17A and the region 17B are therefore assigned the highest order number, while the other syntax models are assigned lower order numbers.

Only the syntax model associated with the window 17A returning a candidate sequence of phonemes whose sequence probability is above the predetermined threshold, it is therefore this syntax model that is selected during step 132, and it is its candidate sequence of phonemes that is defined as constituting the oral instruction corresponding to the audio signal.

The oral instruction is next transmitted to the execution unit 140, which commands a zoom in on the map displayed in the window 17A. At the end of this zoom, only the regions 17B and 17E of the map remain displayed; the syntax models associated with the regions 17C, 17D, 17F and 17G are then deactivated.

The embodiments of invention described above can thus be implemented autonomously by devices having a limited computing power, since only syntax models able to recognize only small numbers of phrases are used, such that it is possible to simply use acoustic models not requiring a very high computing power.

The juxtaposition of these syntax models with one another nevertheless makes it possible to recognize an extended vocabulary, and taking into account the states of the contextual elements makes it possible to make the necessary distinction between the results returned by these different syntax models. It is thus possible to achieve a recognition rate of close to 100% over an extended vocabulary.

Furthermore, some embodiments of the invention make it possible to decrease the error rate by making it possible to take into account instructions emitted in a poor context.

Lastly, the lag times are very short, since, owing to the architecture of the language decoder 38, the determination of the candidate sequences of phonemes can be done practically simultaneously with the acquisition of the audio signal, and the final step, which consists of selecting at least one syntax model to determine the oral instruction corresponding to the audio signal, requires very little computation and is therefore practically instantaneous.

What is claimed is:

1. An automatic speech recognition device comprising:
   an acquisition unit for acquiring an audio signal, a forming member for forming the audio signal, to divide the audio signal into frames, a detection device, and a language decoder for determining an oral instruction corresponding to the audio signal, the detection device being a gaze detector configured to detect which of a plurality states is represented by a direction of a user's gaze and/or a pointing detector configured to detect which of a plurality states is represented by a position of a pointing member, the language decoder comprising:
   at least one acoustic model defining an acoustic probability law for calculating, for each phoneme of a sequence of phonemes, an acoustic probability of that phoneme and a corresponding frame of the audio signal matching;
   at least two different syntax models, each of the syntax models being associated with a respective one of the states of the direction of the user's gaze detected by the gazed detector and/or one of the states of the position of the pointing member detected by the pointing detector or a respective combination of the states, each of the syntax models being definable as active or inactive, each of the active syntax models defining a different respective syntax probability law for calculating, for each phoneme of a sequence of phonemes analyzed using said acoustic model, a different respective syntax probability of that phoneme following the phoneme or group of phonemes preceding said phoneme in the sequence of phonemes;
   an oral instruction construction algorithm implementing the acoustic model and a plurality of the active syntax models from among the syntax models to build, for each active syntax model, a candidate sequence of phonemes associated with said active syntax model so that the product of the acoustic and the respective different syntax probabilities of the different phonemes making up said candidate sequence of phonemes is maximal;
   a contextualization processor to select at least one syntax model selected from among the plurality of active syntax models based on the state of the direction of the user's gaze detected by the gazed detector and/or the state of the position of the pointing member detected by the pointing detector; and
   a determination processor for determining the oral instruction corresponding to the audio signal, to define the candidate sequence of phonemes associated with the selected syntax model or, if several syntax models are selected, the sequence of phonemes, from among the candidate sequences of phonemes associated with the selected acoustic models, for which the product of the acoustic and syntax probabilities of different phonemes making up said sequence of phonemes is maximal, as constituting the oral instruction corresponding to the audio signal.

2. The automatic speech recognition device according to claim 1, wherein the contextualization processor is configured for:
   assigning, based on the state of the direction of the user's gaze detected by the gazed detector and/or the state of the position of the pointing member detected by the pointing detector, an order number to each active syntax model,
   seeking, among the active syntax models, candidate syntax models with which candidate sequences of phonemes are associated for which the product of the acoustic and syntax probabilities of the different phonemes making up said candidate sequences of phonemes is above a predetermined threshold, and
   selecting the candidate syntax model(s) having the highest order number.

3. The automatic speech recognition device according to claim 1, wherein the pointing member is a cursor.

4. The automatic speech recognition device as recited in claim 1 wherein the contextualization processor is configured for:
   assigning, based on the state of the direction of the user's gaze detected by the gazed detector and/or the state of the position of the pointing member detected by the pointing detector, an order number to each active syntax model,
   seeking, among the active syntax models, candidate syntax models with which candidate sequences of phonemes are associated for which the product of the acoustic and syntax probabilities of the different phonemes making up said candidate sequences of phonemes is above a predetermined threshold, and
   selecting the candidate syntax model(s) having the highest order number,
   the automatic speech recognition device further comprising a display device displaying objects, each syntax model being associated with a respective object from among the displayed objects, the contextualization processor being configured for assigning an order number thereof to each syntax model based on the distance between the direction of the user's gaze or the position of the pointer and the displayed object with which said syntax model is associated.

5. An assistance system to assist with the piloting or maintenance of an aircraft, comprising:
the automatic speech recognition device according to claim 1; and
a command execution unit configured to execute the oral instruction corresponding to the audio signal.

6. An automatic speech recognition method comprising:
determining an oral instruction corresponding to an audio signal, the determining of the oral instruction being implemented by an automatic speech recognition device comprising:
at least one acoustic model defining an acoustic probability law for calculating, for each phoneme of a sequence of phonemes, an acoustic probability of that phoneme and a corresponding frame of the audio signal matching,
at least two different syntax models, each of the syntax models being associated with a respective state of a direction of a user's gaze and/or of a position of a pointing member or a respective combination of the states, each of the syntax models being definable as active or inactive, each of the active syntax models defining a different respective syntax probability law for calculating, for each phoneme of a sequence of phonemes analyzed using said acoustic model, a different respective syntax probability of that phoneme following the phoneme or group of phonemes preceding said phoneme in the sequence of phonemes,
wherein the determining of the oral instruction comprises:
acquiring the audio signal,
detecting a detected state represented by a direction of a user's gaze and/or by a position of a pointing member,
activating a plurality of syntax models forming active syntax models,
forming the audio signal, said forming comprising dividing the audio signal into frames,
building, for each active syntax model, using the acoustic model and said active syntax model, a candidate sequence of phonemes associated with said active syntax model so that the product of the acoustic and the respective different syntax probabilities of the different phonemes making up said candidate sequence of phonemes is maximal,
selecting at least one syntax model from among the active syntax models based on the detected state of the direction of the user's gaze and/or the detected state of the position of the pointing member, and
defining the candidate sequence of phonemes associated with the selected syntax model or, if several syntax models are selected, the sequence of phonemes, from among the candidate sequences of phonemes associated with the selected syntax models, for which the product of the acoustic and syntax probabilities of different phonemes making up said sequence of phonemes is maximal, as constituting the oral instruction corresponding to the audio signal.

7. The automatic speech recognition method according to claim 6, wherein the selection step comprises the following sub-steps:

assigning, based on the detected state of the direction of the user's gaze and/or the detected state of the position of the pointing member, an order number to each active syntax model,
seeking, among the active syntax models, candidate syntax models with which candidate sequences of phonemes are associated for which the product of the acoustic and syntax probabilities of the different phonemes making up said candidate sequences of phonemes is above a predetermined threshold, and
selecting candidate syntax model(s) having the highest order number.

8. The automatic speech recognition method according to claim 6, wherein the pointing member is a cursor.

9. The automatic speech recognition method according to claim 6, wherein the selection step comprises the following sub-steps:
assigning, based on the detected state of the direction of the user's gaze and/or the detected state of the position of the pointing member, an order number to each active syntax model,
seeking, among the active syntax models, candidate syntax models with which candidate sequences of phonemes are associated for which the product of the acoustic and syntax probabilities of the different phonemes making up said candidate sequences of phonemes is above a predetermined threshold, and
selecting candidate syntax model(s) having the highest order number,
wherein objects are displayed on a display device, each syntax model being associated with a respective object from among the displayed objects, and the order number is assigned to each syntax model based on the distance between the direction of the user's gaze or the position of the pointing member and the displayed object with which said syntax model is associated.

10. The automatic speech recognition method according to claim 6, wherein the direction of the user's gaze consists in a direction of the user's gaze at the end of the acquisition of the audio signal.

11. An assistance method for assisting with the piloting or maintenance of an aircraft, implemented by a piloting assistance system or a maintenance assistance system of said aircraft, the assistance method comprising:
determining, using the automatic speech recognition method according to claim 6, an oral instruction corresponding to a recorded audio signal; and
executing the oral instruction via the assistance system.

12. An assistance system to assist with the piloting or maintenance of an aircraft, comprising:
an automatic speech recognition device comprising:
an acquisition unit for acquiring an audio signal, a forming member for forming the audio signal, to divide the audio signal into frames, a detection device, and a language decoder for determining an oral instruction corresponding to the audio signal, the detection device being a detector configured to detect which of a plurality states is represented by a flight phase of the aircraft and/or a system status of the aircraft, the language decoder comprising:
at least one acoustic model defining an acoustic probability law for calculating, for each phoneme of a sequence of phonemes, an acoustic probability of that phoneme and a corresponding frame of the audio signal matching;
at least two different syntax models, each of the syntax models being associated with a respective one of the states of the flight phase of the aircraft and/or of the system status of the aircraft detected by the detector or a respective combination of the states, each of the syntax models being definable as active or inactive, each of the active syntax models defining a different respective syntax probability law for calculating, for each phoneme of a sequence of phonemes analyzed using said acoustic model, a different respective syntax probability of that phoneme following the phoneme or group of phonemes preceding said phoneme in the sequence of phonemes;

an oral instruction construction algorithm implementing the acoustic model and a plurality of the active syntax models from among the syntax models to build, for each active syntax model, a candidate sequence of phonemes associated with said active syntax model so that the product of the acoustic and the respective different syntax probabilities of the different phonemes making up said candidate sequence of phonemes is maximal;

a contextualization processor to select at least one syntax model selected from among the plurality of active syntax models based on the state of the flight phase of the aircraft and/or of the system status of the aircraft detected by the detector; and a determination processor for determining the oral instruction corresponding to the audio signal, to define the candidate sequence of phonemes associated with the selected syntax model or, if several syntax models are selected, the sequence of phonemes, from among the candidate sequences of phonemes associated with the selected acoustic models, for which the product of the acoustic and syntax probabilities of different phonemes making up said sequence of phonemes is maximal, as constituting the oral instruction corresponding to the audio signal; and a command execution unit configured to execute the oral instruction corresponding to the audio signal.

13. The assistance system according to claim 12, wherein the contextualization processor is configured for:

assigning, based on the state of the flight phase of the aircraft and/or of the system status of the aircraft detected by the detector, an order number to each active syntax model, seeking, among the active syntax models, candidate syntax models with which candidate sequences of phonemes are associated for which the product of the acoustic and syntax probabilities of the different phonemes making up said candidate sequences of phonemes is above a predetermined threshold, and selecting the candidate syntax model(s) having the highest order number.

14. An assistance method for assisting with the piloting or maintenance of an aircraft, implemented by a piloting assistance system or a maintenance assistance system of said aircraft, the assistance method comprising:

determining an oral instruction corresponding to a recorded audio signal the determining of the oral instruction being implemented by an automatic speech recognition device comprising:

at least one acoustic model defining an acoustic probability law for calculating, for each phoneme of a sequence of phonemes, an acoustic probability of that phoneme and a corresponding frame of the audio signal matching, at least two different syntax models, each of the syntax models being associated with a respective state of a flight phase of the aircraft and/or of a system status of the aircraft or a respective combination of the states, each of the syntax models being definable as active or inactive, each of the active syntax models defining a different respective syntax probability law for calculating, for each phoneme of a sequence of phonemes analyzed using said acoustic model, a different respective syntax probability of that phoneme following the phoneme or group of phonemes preceding said phoneme in the sequence of phonemes, wherein determining the oral instruction comprises:
acquiring the audio signal,
detecting a detected state represented by a flight phase of the aircraft and/or by a system status of the aircraft,
activating a plurality of syntax models forming active syntax models,
forming the audio signal, said forming comprising dividing the audio signal into frames,
building, for each active syntax model, using the acoustic model and said active syntax model, a candidate sequence of phonemes associated with said active syntax model so that the product of the acoustic and the respective different syntax probabilities of the different phonemes making up said candidate sequence of phonemes is maximal,
selecting, at least one syntax model from among the active syntax models based on the detected state of the flight phase of the aircraft and/or the detected state of the system status of the aircraft, and
defining the candidate sequence of phonemes associated with the selected syntax model or, if several syntax models are selected, the sequence of phonemes, from among the candidate sequences of phonemes associated with the selected syntax models, for which the product of the acoustic and syntax probabilities of different phonemes making up said sequence of phonemes is maximal, as constituting the oral instruction corresponding to the audio signal,
wherein the assistance method further comprises executing the oral instruction via the assistance system.

15. The assistance method according to claim 14, wherein the selection step comprises the following sub-steps:

assigning, based on the detected state of the flight phase of the aircraft and/or the detected state of the system status of the aircraft, an order number to each active syntax model, seeking, among the active syntax models, candidate syntax models with which candidate sequences of phonemes are associated for which the product of the acoustic and syntax probabilities of the different phonemes making up said candidate sequences of phonemes is above a predetermined threshold, and selecting candidate syntax model(s) having the highest order number.

* * * * *